July 7, 1925.　　　　　　　　　　　　　　　　1,544,887
J. W. BURTLESS
BEET HARVESTER
Filed Nov. 24, 1922　　　　4 Sheets-Sheet 1
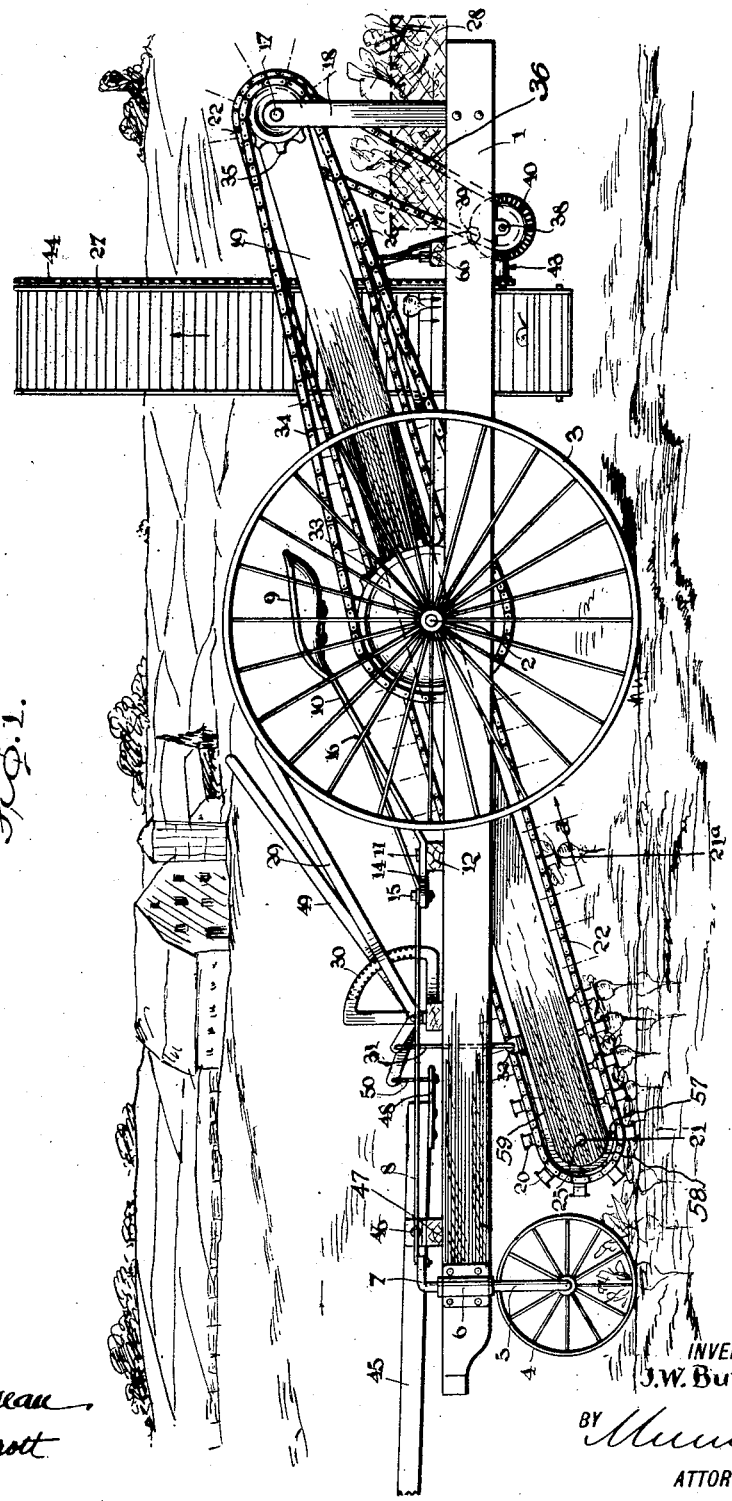
WITNESSES
INVENTOR
J. W. Burtless,
BY
ATTORNEYS

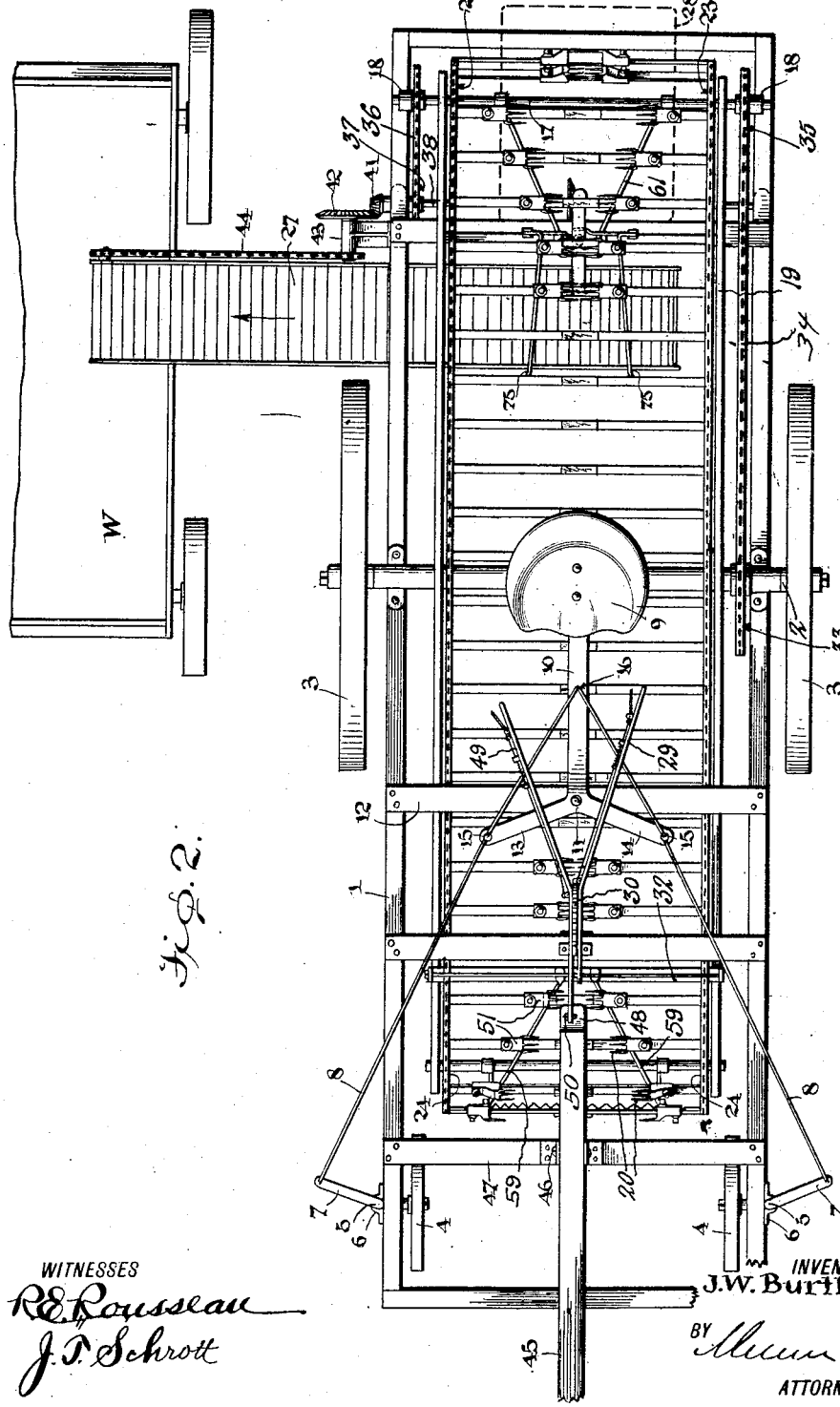

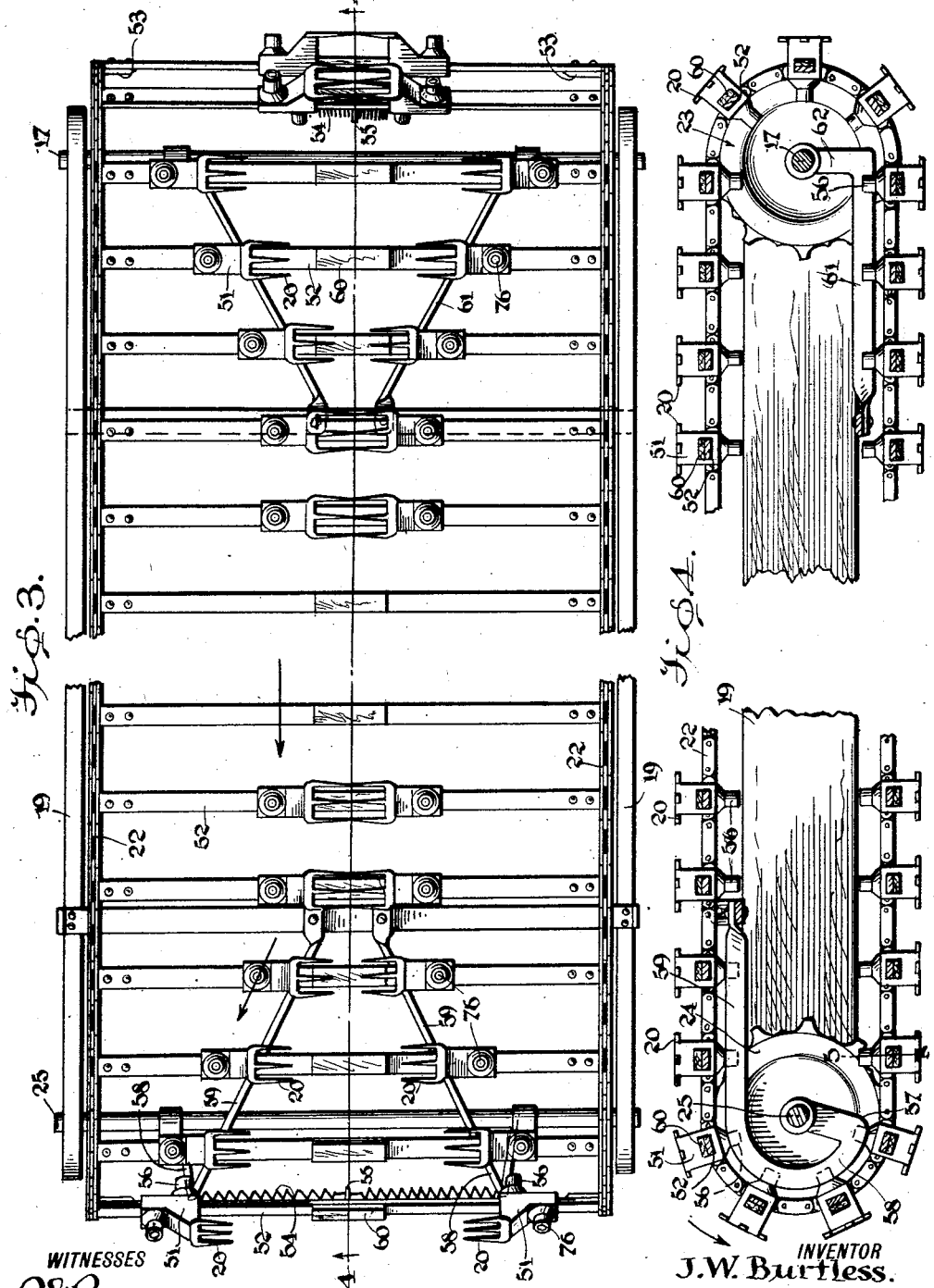

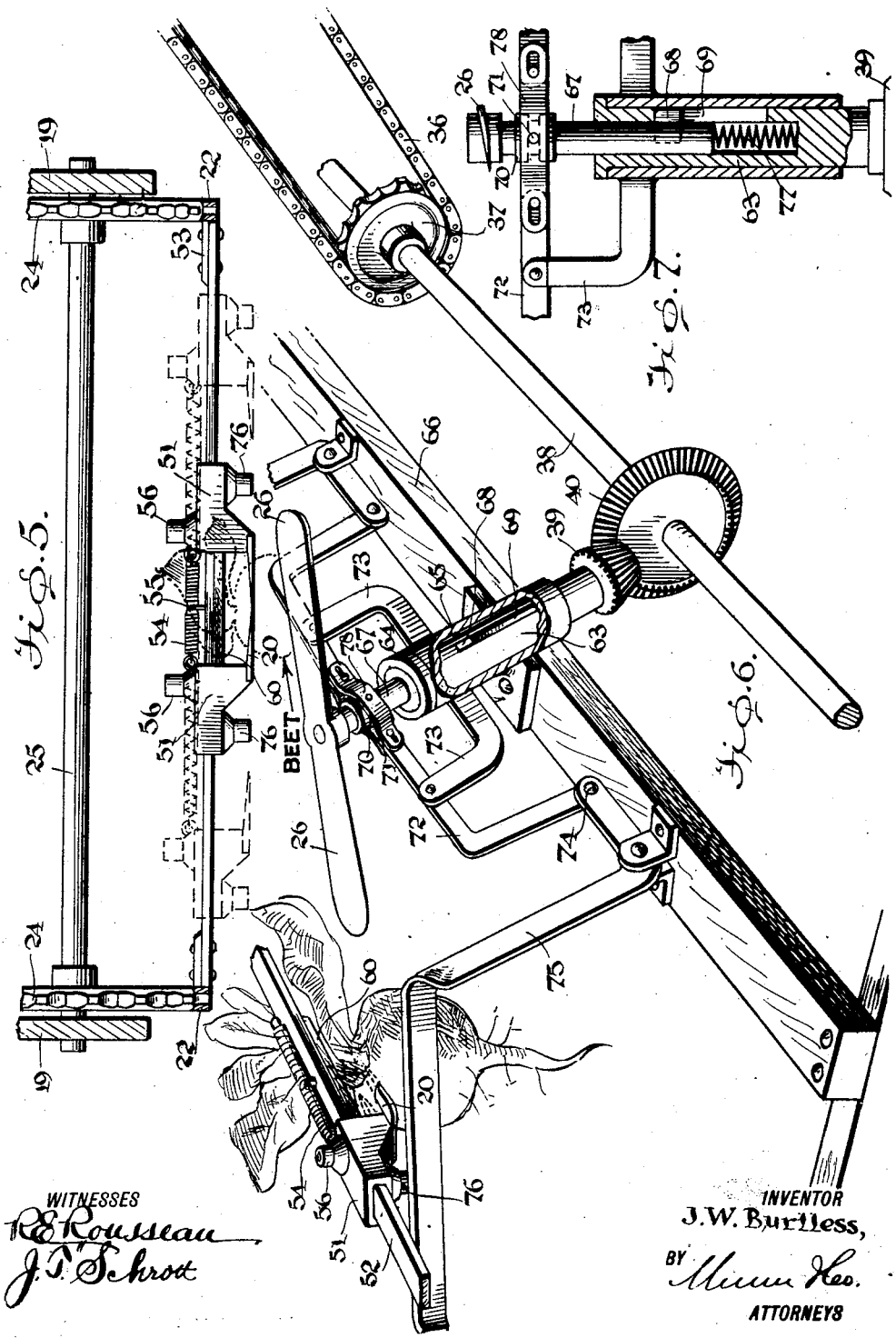

Patented July 7, 1925.

1,544,887

UNITED STATES PATENT OFFICE.

JOHN WESLEY BURTLESS, OF McCOOK, NEBRASKA.

BEET HARVESTER.

Application filed November 24, 1922. Serial No. 603,031.

*To all whom it may concern:*

Be it known that I, JOHN WESLEY BURTLESS, a citizen of the United States, and a resident of McCook, in the county of Redwillow and State of Nebraska, have invented certain new and useful Improvements in Beet Harvesters, of which the following is a specification.

My invention relates to improvements in beet harvesters and it consists in the constructions combinations and mode of operation herein described and claimed.

An object of the invention is to provide a harvester with means for taking hold of the top only and thereby pulling the beet from the ground.

A further object of the invention is to provide means for gauging the cutting position of the topping knife, said means being actuated either directly or indirectly by the beet, the diameter of which determines the position of said knife.

A further object of the invention is to provide a harvester which will pull the beet directly from the ground in a vertical direction, and not drag the beet forwardly or backwardly so as to impede the motion of the harvester and possibly injure the beet.

A further object of the invention is to provide an arrangement of forks for gripping the beet tops, and means for gauging the height at which the forks grip the beet, so as to make sure that each beet will be gripped in substantially the same place.

Other objects and advantages will appear in the following specification, reference being had to the accompanying drawings, in which:—

Fig. 1 is a side elevation of the beet harvester,

Fig. 2 is a top plan view,

Fig. 3 is a detail plan view of the beet conveyor, particularly illustrating the beet forks, the tracks at the extremities which actuate them and the wooden blocks which act as pressers for the beets and also as stops limiting the inward movement of the beet forks, Fig. 4 is a longitudinal section taken substantially on the line 4—4 of Fig. 3, Fig. 5 is a detail cross section taken substantially on the line 5—5 of Fig. 4, particularly illustrating the arrangement of slides which carry the beet-impaling forks, Fig. 6 is a perspective view illustrating the mechanism by which the position of the topping knife is gauged by the size of the beet, and Fig. 7 is a detail sectional view illustrating the parts associated with the topping knife shaft.

Generally described, the beet harvester is composed of a frame 1 suspended from the axle 2 of a pair of drive wheels 3. The frame 1, properly designated the "main" frame, has steering wheels 4 at the front, these being journalled on the right angled parts of shafts 5 which are supported in bearings 6 on the main frame and terminate in other right-angled ends 7 to which radius rods 8 are attached.

These radius rods 8 (Fig. 2) run back to the operator's seat 9, the support 10 of which is pivoted at 11 to a cross beam 12 of the main frame and thereafter branches out into arms 13 and 14 to which the radius rods are secured at 15 before reaching their final places of attachment at 16 on the support 10. The purpose of the arrangement described in this: The operator occupies the seat 9 and braces himself against the main frame by placing his feet on the cross beam 12. A push on one or the other side, will cause a pull on the corresponding radius rod 8, the seat and support turning on the pivot 11, so that the steering wheels 4 are turned to the angle desired so as to drive the harvester. It follows that a pull on one radius rod tends to exert a push on the other and such push is naturally accomplished by virtue of the fact that the radius rods are stiff enough to move the steering wheels into the positions desired, and to hold them there.

Pivoted on a shaft 17 in standards 18 on the main frame 1, is an auxiliary frame 19 which carries the beet pulling mechanism. This mechanism consists principally of an arrangement of forks 20 which are adapted to snap into the beet tops by a spring action, substantially at the place indicated by the line 21 in Fig. 1. These forks are carried by chains 22 which run over pairs of sprockets 23 and 24, respectively mounted on the shaft 17 (already mentioned) and a corresponding shaft 25 at the opposite end of the auxiliary frame.

The auxiliary frame 19 stands at an inclination so as to elevate the beets from the ground to the topping knife 26, adjacent to which is the elevator 27 and a basket 28, respectively for the purpose of receiving the topped beets and the severed tops of the beets. The former are discharged into a wagon W which is supposed to run along with the harvester. The severed tops may be discharged at suitable intervals and at designated places. The front or free end of the auxiliary frame 19 (the end opposite the pivotal mounting 17) may be raised and lowered by means of a lever 29 (adjacent to the operator's seat 9), a quadrant 30 and suitable detents on the lever serving to hold the adjustment. A link 31 forms the connection between the angled end of the lever and a bracket 32 on the auxiliary frame.

A large sprocket 33 drives the shaft 17 by means of a chain 34 which is applied to a smaller sprocket 35 on the shaft 17. The topping knife 26 is driven from the shaft 17 by means of chain and sprocket connections 36 and 37, the sprocket 37 being mounted on a countershaft 38 from which the knife pinion 39 (Fig. 6) is driven by means of a bevel gear 40. The countershaft 38 has a bevel pinion 41 (Fig. 2) for driving the bevel gear 42 of the elevator 27. This gear is mounted on a shaft in a bearing 43 and serves to drive the chain 44 which in turn operates the elevator.

A tongue 45 is pivoted at 46 on a cross beam 47 at the front of the main frame, the rear end of the tongue carrying a plate 48 to which connection of a lever 49 is made by means of a link 50. By raising the rear end of the tongue, the front wheels 4 of the harvester are lifted off the ground, thus mounting the entire machine on the two main drive wheels 3 very much on the order of a two-wheeled cart. This in turn raises the chain belt of the auxiliary frame 19 and the forks 20 above the tops of the beets. The harvester can now be turned around at the end of a row with great ease.

The quadrant 30, described in connection with the elevating lever 29, also serves the lever 49, it being observed that the quadrant has a double row of teeth in respect to which the detents of the two levers are suitably arranged to cooperate. Since the detents are common structures, no detailed illustration is made thereof beyond the conventional showing in Fig. 2. The beet pulling and topping mechanisms require further and more detailed descriptions because these are important features of the invention and should be fully understood. Consider first the beet pulling mechanism. As described above, this mechanism is composed principally of the forks 20. These are mounted on slides 51, of which they may either be integral parts or to which they may be attached by suitable means. There is a pair of slides, and consequently of forks, on each of a plurality of slide bars 52 which span the chains 22 (Fig. 3).

The slide bars are secured at the ends to special links 53 of the chains 22, these links differing from the others merely by the addition of the inwardly extending brackets to which the slide bars are riveted.

Springs 54 are fastened between a lug 55 (Fig. 5) and each of the slides 51 on each slide bar so as to pull the slides together and cause the forks 20 to snap into or impale the top of a beet when the rollers 56 move off from the lower end 57 (Figs. 1 and 4) of the circular part 58 of a track 59.

There is a wooden or other block 60 on each of the slide bars 52. These blocks perform several useful functions in the operation of the harvester; 1, to act as an abutment for the shoulders of a pair of slides 51 on a slide bar 52, should no beet be in place to be impaled by the forks 20 when the roller 56 moves from the circular track 58 at the point 57 (Figs. 4 and 5); 2, when the beets are plowed by a beet digger they vary in height in respect to the ground, another purpose of the wooden blocks 60 therefore being to press down the beets to a uniform height above the ground as the harvester rides thereover, thus regulating the height at which the forks 20 will strike into the top of the beet. In actual practice, the beet forks and consequently the wooden blocks, are intended to be close enough together so that they will roll every beet down to the same level.

An arrangement of tracks 61 (Fig. 3), somewhat similar to the arrangement 59, is disposed at the upper end of the auxiliary frame 19 and is for the purpose of opening the forks 20 so that they may drop the beet tops into the basket 28 after the beets themselves have been severed by the knife 26 and have fallen onto the elevator 27. Both sets of tracks are alike in this respect that they flare toward the respective ends of the auxiliary frame, and the purpose of each is alike in that each is intended to separate the forks, but they differ by the absence of rounded ends on the tracks 61 although the rollers 56 are intended to move past the right angled ends 62 (Fig. 4) and thus accomplish the closure of the forks by means of the springs 54.

The beet topping mechanism includes means for adjusting the knife 26 up or down so that all of the beets are severed from the tops at substantially the same place as they are presented. As shown in Fig. 6, the knife consists of a plurality of blades which are made to revolve rapidly by means of the gear connections 39 and 40. The pinion 39 is secured to a sleeve 63 which has a collar 64 to rest on the bearing 65 in which the sleeve 63 is journalled. The bearing 65 is fastened to a cross beam 66 of the main frame 1.

The knife 26 is fastened to a shaft 67 which is axially slidable in the sleeve 63 but is made to revolve therewith by the key and slot connection 68 and 69. The slot 69 is long enough to accommodate as much relative movement of the shaft 67 as the ordinary operation of the gauging mechanism will be likely to require. A spring 77 between the end of the shaft 67 and the bottom of the bore in the sleeve 63 keeps the knife raised to the highest position when not forced down by the spread of the forks 20.

A grooved collar 70, fixed on the shaft 67, receives the rollers 71 of an equalizer link or arm 78 which forms the connection between the ends of a pair of levers 72. These levers are pivoted on supports 73 and have connection at 74 to a pair of gauge arms 75. The free ends of these arms (Figs. 2 and 6) are adapted to be engaged by rollers 76 on the undersides of the slides 51, and be rocked laterally a distance corresponding substantially to the diameter of the beet with the result that the knife 26 will be raised or lowered in accordance by the lever and equalizer mechanism 72 and 78 and so automatically gauge the cutting point.

The operation may be briefly reviewed to advantage. The beets are first plowed by a beet digger so as to loosen them from the soil. The harvester in Fig. 1 is then run over the row of beets, the forward rotational movement of the driving wheels 3 causing the movement of the chain belt 22 in the direction of the arrows in Fig. 3, that is to say, downwardly on top and upwardly underneath.

The beet forks 20 are closed while they traverse the distance between the opening tracks 59 and 61, the springs 54 holding the shoulders of the slides 51 against the wooden blocks 60. As the beet forks approach the opening tracks 59 on the upper side of the chain belt, the rollers 56 come into engagement with the diverging parts of the track by means of which the forks 20 are fully separated (Fig. 3, left side).

As soon as the rollers move beyond the point 57 (Fig. 4) the springs 54 cause the slides 51 to close and impale the top of a beet should one be in position underneath. In case there should be no beet in position, the blocks 60 will act as abutments for the slides and thus prevent the tines of the forks from striking.

Should the beet harvester run off center in respect to the row of beets, only one of the forks 20 will act to impale the beets, that is to say, one of the forks will be moved from the closed position while the other remains in the closed position. The link or arm 78 (Figs. 6 and 7) now functions to equalize the lowering of the topping knife the extent of which would be approximately one-half as much as if both forks were moved the same distance from the center. The functioning of this particular portion of the machine is regarded as important to the accurate gauging of the knife.

An important feature of the invention is to be observed in this that the beets are pulled directly from the ground in a substantially vertical line and are dragged neither forwardly nor rearwardly to cause a possible injury thereto. This feature is illustrated in Fig. 1: the beet impaling act occurs at a place substantially on the line 21 in Fig. 1. The reader can easily imagine the set of forks now on the line 21, as moving backwardly and upwardly at the same time that the harvester moves forwardly.

In actual practice, the gearing will be so arranged that the particular set of forks in question will remain substantially on the line 21, although actually, that set of forks will be traveling upwardly and rearwardly, abstracting the beets from the ground all the while. Such act is completed at about the time that the set of forks in question has moved the distance between the line 21 and 21$^a$. The beet retains substantially the same vertical relationship to the ground as it travels the rest of the way, to the topping knife 26, but the retension of this relationship is merely incidental to the established steering ratio, such ratio serving no useful purpose after the beet is once completely pulled from the ground.

As soon as the set of forks bearing the beets approaches the topping knife 26, the rollers 76 will engage the gauge arms 75, shift them laterally in accordance with the distance of separation of the slides 51, and proportionately rock the levers 72 and lower the knife 26 against the tension of spring 77 (Fig. 7) into the plane where the cut should be made. The severed beets fall onto the elevator 27, while the set of forks mentioned carry the tops back for deposit into the basket 28. The top is released upon engagement of the rollers 56 with the diverging tracks 61 which cause the slides to separate until the angled part 62 (Fig. 4) is reached, whereupon the springs 54 again draw the now empty forks together (Fig. 3).

The reader can readily understand that the wooden blocks 60 will level all of the beets in the row to a substantially uniform height above the ground, so that the forks 20 will always pierce the beet tops in substantially the same place. Since the beets are first loosened before the harvester is run over the row, it becomes easy for the wooden blocks to level them as described.

The lever 29 is used to lift the free end of the pulling apparatus entirely from the ground.

The lever 49 is used to rock the entire harvester frame 1 on the axle 2 so that the harvester will run only on the main drive wheels 3. This expedient is made use of when it is desired to turn the harvester, as for example at the end of a row.

While the construction and arrangement of the improved beet harvester as herein described and claimed, is that of a generally preferred form, obviously modifications and changes may be made without departing from the spirit of the invention or the scope of the claims.

I claim:—

1. A beet harvester having a pair of forks, supporting means in respect to which the forks are adapted to move, diverging tracks, means associated with each fork adapted to engage each track to separate the forks on said supporting means as the forks move toward an impaling position, means to draw the forks together after said engaging means leave the ends of the tracks to impale a beet, and means on said supporting means to be engaged by part of the fork to prevent them from striking should there be no beet at the impaling position.

2. A beet harvester having a pair of forks, means upon which they are slidable into a separated position, means which separate them as they travel in one direction in respect to said means, means which are put under tension as the forks separate and which again draw them together after said separating means are passed, and abutment means on said slide against which parts of the forks are adapted to strike to prevent engagement of the tines of the forks.

3. A beet harvester having a fork, and means associated with the fork adapted to bear on the top of the beet and thus gauge the place at which the fork shall pierce the top.

4. A beet harvester having a fork, an element on which the fork is mounted to move back and forth, and means carried by said element adapted to bear on the top of a beet and thus gauge the place at which the fork shall pierce the top when the fork moves forth.

5. A beet harvester having a slide bar, a pair of slides movable on the bar, a fork on each slide, resilient means to draw the slides toward each other on the bar, and a block to act as an abutment for the slides and prevent the forks from engaging should no beet be in the impaling position and to bear on the top of the beet to gauge the position at which the forks shall impale the top.

6. A beet harvester having a pair of endless chains, slide bars extending from one chain to the other and secured to certain links to space them apart equally, a pair of slides on each bar carrying forks, and means adjacent to each end of the chains adapted to move the slides to separated positions for respectively impaling and releasing the tops.

7. A beet harvester having a pair of slides with forks, means carrying the slides in a closed and beet-carrying position, a beet topping knife means adapted to adjust said beet topping knife in respect to a beet carried by the approaching forks, and means carried by the slide adapted to engage said means and shift the knife into a position to cut off a predetermined amount of the beet top.

8. A beet harvester having a pair of slides with forks, means by which the slides are supported and conveyed in a closed beet-carrying position, a beet cutting knife a pair of arms adapted to be approached by the slides and the forks carrying a beet, said arms being adapted to shift said beet cutting knife in the plane of the forks; and a roller carried by each slide to engage and shift the arms in proportion to the size of the beet and correspondingly shift said knife.

9. A beet harvester having a pair of forks adapted to move together but limited in such movement by the diameter of a beet to be impaled, a beet topping knife a pair of arms in the path of the forks adapted to set said topping knife in respect to the forks and thus determine the depth of the cut, and means carried by parts of the forks to engage the arms and shift the arms so as to adjust the knife.

10. A beet harvester comprising a main frame with drive wheels on an axle carrying a drive gear, an auxiliary frame pivoted on an axle carrying a driven sprocket in chain connection with said gear, an axle on the other end of said auxiliary frame carrying sprockets, a chain running on said sprockets and similar sprockets on the aforesaid axle, a chain from another sprocket on said pivot axle to a countershaft, a beet topping knife driven from said countershaft, an elevator for topped beets also driven from said countershaft, means to receive the beet tops, and beet forks carried by the chain on said auxiliary frame for lifting the beets from the ground and conveying them toward said topping knife.

11. A beet harvester having a pair of endless chains, slide bars extending from one chain to the other and secured to certain links to space them apart equally and substantially close together leaving no space between forks greater than the distance between two tines of the same fork thus forming a continuous chain of fork tines so that no beets will be missed by the forks, a pair of slides on each bar carrying forks, and means adjacent to each end of the chains adapted to move the slides to separated position for respectively impaling and releasing the tops.

12. A beet harvester having individually movable impaling means, a topping knife, means extending from the impaling means to the topping knife to cause a movement of the knife upon movement of the impaling means preparatory to engaging a beet, and means which furnish the operating element for the knife by the connecting means serving to equalize the gauging movement of the knife should the movements of the impaling means be uneven.

JOHN WESLEY BURTLESS.